(12) United States Patent
Jejcic (10) Patent No.: US 9,339,049 B2
(45) Date of Patent: May 17, 2016

(54) BATCH-FREEZER MACHINE FOR PRODUCING ICE-CREAM AND SIMILAR

(71) Applicant: Valmar Global Vse Za Sladoled D.O.O., Volcja Draga (SI)

(72) Inventor: Valter Jejcic, Nova Gorica (SI)

(73) Assignee: Valmar Global Vse Za Sladoled D.O.O., Volcja Draga (SI)

( * ) Notice: Subject to any disclaimer, the term of this patent is extended or adjusted under 35 U.S.C. 154(b) by 272 days.

(21) Appl. No.: 14/026,064

(22) Filed: Sep. 13, 2013

(65) Prior Publication Data

US 2014/0102128 A1    Apr. 17, 2014

(30) Foreign Application Priority Data

Sep. 14, 2012 (IT) ............................... TV2012A0177

(51) Int. Cl.
| | |
|---|---|
| *A23G 9/00* | (2006.01) |
| *A23G 9/08* | (2006.01) |
| *A23G 9/22* | (2006.01) |
| *B01F 15/02* | (2006.01) |
| *A23G 9/12* | (2006.01) |
| *A23G 9/28* | (2006.01) |

(52) U.S. Cl.
CPC .. *A23G 9/08* (2013.01); *A23G 9/12* (2013.01); *A23G 9/22* (2013.01); *A23G 9/224* (2013.01); *A23G 9/225* (2013.01); *A23G 9/28* (2013.01); *A23G 9/287* (2013.01); *B01F 15/0274* (2013.01)

(58) Field of Classification Search
CPC ........... A23G 9/08; A23G 9/22; A23G 9/224; A23G 9/28; A23G 9/287; B01F 15/027
See application file for complete search history.

(56) References Cited

U.S. PATENT DOCUMENTS

| | | | | | |
|---|---|---|---|---|---|
| 1,837,565 | A | * | 12/1931 | McDougall | 366/144 |
| 2,522,648 | A | * | 9/1950 | Tacchella | 62/158 |
| 2,746,730 | A | * | 5/1956 | Swenson et al. | 366/311 |
| 2,924,952 | A | * | 2/1960 | Swenson et al. | 62/304 |
| 3,050,960 | A | * | 8/1962 | Clifford | 62/342 |
| 3,159,007 | A | | 12/1964 | Rahauser et al. | |
| 3,958,968 | A | * | 5/1976 | Hosaka | 62/343 |
| 4,758,097 | A | | 7/1988 | Iles, Sr. | |
| 4,922,725 | A | * | 5/1990 | Rasmussen | 62/136 |
| 5,199,278 | A | * | 4/1993 | Cocchi | 62/343 |
| 6,817,203 | B1 | * | 11/2004 | Rischewski | 62/303 |
| 2001/0052239 | A1 | * | 12/2001 | Dorner | 62/342 |
| 2004/0256407 | A1 | * | 12/2004 | Ross | 222/1 |

(Continued)

FOREIGN PATENT DOCUMENTS

| | | | | | |
|---|---|---|---|---|---|
| CN | 201232451 | Y | * | 5/2009 | ............. E05D 11/06 |
| FR | 2 931 036 | A1 | | 11/2009 | |

(Continued)

*Primary Examiner* — Emmanuel Duke
(74) *Attorney, Agent, or Firm* — Blank Rome LLP (57) ABSTRACT

A batch-freezer machine for producing ice-cream. The machine includes a cylindrical-shaped processing tank and a rotating mixing member housed in an axially rotatable manner inside the processing tank, and structured so as to be able to blend/mix the semi-solid mixture that forms inside the processing tank. The mixing member is provided with a centrifugal impeller which is arranged to directly face the inner face of the hatch, and is structured so as to be able to push/eject the semi-solid mixture located at the center of the opening of the processing tank towards the internal cylindrical lateral surface of the processing tank, when the mixing member rotates inside the processing tank.

18 Claims, 4 Drawing Sheets

(56) References Cited

U.S. PATENT DOCUMENTS

| | | | |
|---|---|---|---|
| 2005/0081554 A1* | 4/2005 | Ross | 62/342 |
| 2006/0062078 A1* | 3/2006 | Jejcic | 366/310 |
| 2007/0133343 A1 | 6/2007 | Jejcic | |
| 2007/0140053 A1* | 6/2007 | Jejcic | 366/311 |
| 2008/0173038 A1* | 7/2008 | Cocchi et al. | 62/342 |

FOREIGN PATENT DOCUMENTS

| | | | |
|---|---|---|---|
| FR | 2 938 730 A3 | 5/2010 | |
| FR | 2938730 A3 * | 5/2010 | A23G 9/04 |

* cited by examiner

BATCH-FREEZER MACHINE FOR PRODUCING ICE-CREAM AND SIMILAR

The present invention relates to a batch-freezer machine for producing ice-cream and similar.

More in detail, the present invention relates to a horizontal axis batch-freezer machine for producing ice-cream and similar. Use to which the following discussion will make explicit reference without thereby losing generality.

BACKGROUND OF THE INVENTION

As is well known, most of the batch-freezer machines that are normally used for producing homemade ice-cream, are provided with a processing tank of a substantially cylindrical shape that extends horizontally inside the machine, starting from the front facing wall of the machine; with a closing hatch that is hinged on the front facing wall of the machine so as to rotate around a vertical axis to and from an operating position in which it closes the opening of the fluid-tight processing tank; with an internal refrigerating system that is adapted to bring and maintain the processing tank and its contents to a temperature usually between −10° C. and −35° C.; and with a rotating mixing member that is mounted in an axially rotatable manner inside the processing tank, so as to be able to continuously blend and then mix the semi-solid mixture that forms inside the processing tank during the cooling of the processing tank, so as to obtain homemade ice-cream.

The ingredients necessary to produce the ice-cream are poured inside the processing tank through a hopper specifically made on the upper portion of the closing hatch, while the ice-cream is extracted from the processing tank through a discharge outlet with manual opening and closing which is usually arranged on the lower portion of the closing hatch, using the driving force of the mixing member.

In most horizontal axis batch-freezer machines currently on the market, the mixing member is constituted by a rigid body substantially in the shape of a cylindrical cage, which is inserted in a removable and axially rotatable manner inside the processing tank, and extends coaxial with a reference axis which, in use, is coincident with the longitudinal axis of the processing tank.

More in detail, in most horizontal axis batch-freezer machines currently on the market, the mixing member is composed of two supporting hubs that are arranged immediately next to the two axial ends of the processing tank, both locally coaxial to the longitudinal axis of the tank; and of a series of longitudinal scraping blades that are angularly equally spaced around the longitudinal axis of the processing tank, and extend substantially tangent to the internal cylindrical surface of the processing tank, roughly the entire length of the processing tank, so as to rigidly connect/join one with the other.

The supporting hub which is arranged behind the bottom of the processing tank, is usually provided with a coupling pin that projects cantilevered towards the bottom of the processing tank while remaining locally coaxial to the longitudinal axis of the tank, and is structured so to engage in an angularly rigid way, within a rotating bushing that is arranged on the bottom of the processing tank coaxial to the longitudinal axis of the tank, and is driven in rotation by an electric motor arranged outside the tank.

Generally the scraping blades are instead wound around the longitudinal axis of the tank in a helical movement, while remaining locally substantially tangent to the internal cylindrical surface of the processing tank, and are connected directly to the two supporting hubs so as to form a kind of screw that, by rotating inside the processing tank, is able to remove/scrape the ice-cream from the tank wall and at the same time push the ice-cream towards the front closing hatch.

SUMMARY OF THE INVENTION

Purpose of the present invention is therefore to obtain a batch-freezer machine for producing ice-cream and similar which is capable of producing a softer and creamier ice-cream than those currently on the market.

In agreement with these objectives, according to the present invention is provided a batch-freezer machine for producing ice-cream and similar as explained in claim 1 and preferably, but not necessarily, in any one of the dependent claims.

According to the present invention a mixing member for batch-freezer machines for producing ice-cream and similar as explained in claim 14 and preferably, but not necessarily, in any one of the dependent claims is also obtained.

BRIEF DESCRIPTION OF THE DRAWINGS

The present invention will now be described with reference to the accompanying drawings, which illustrate a non-limiting embodiment, wherein:

FIG. 3 is an enlargement of a part of FIG. 2; while

DETAILED DESCRIPTION OF THE INVENTION

Figure 1:
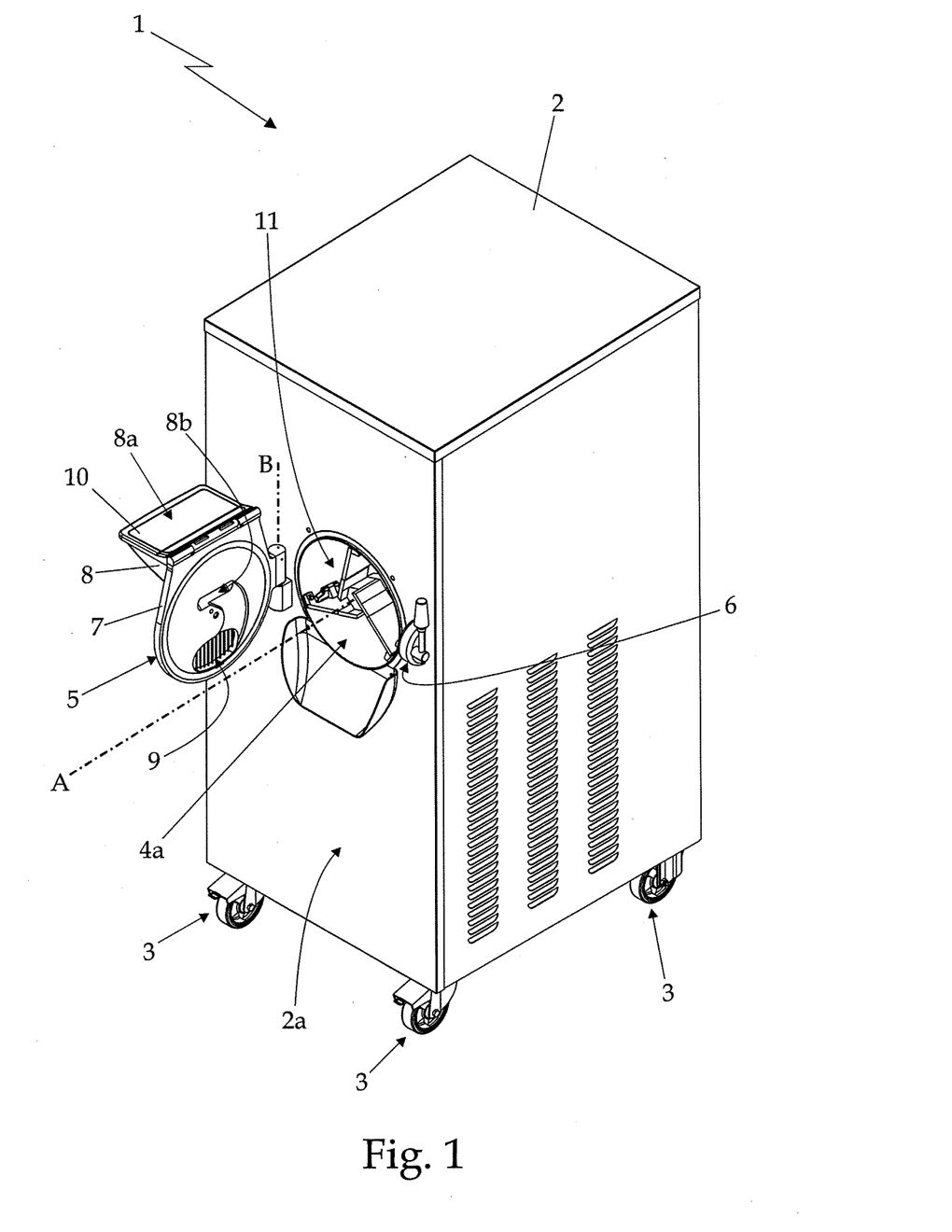
FIG. 1 is a perspective view of a batch-freezer machine for producing ice-cream obtained according to the teachings of the present invention.
Figure 2:
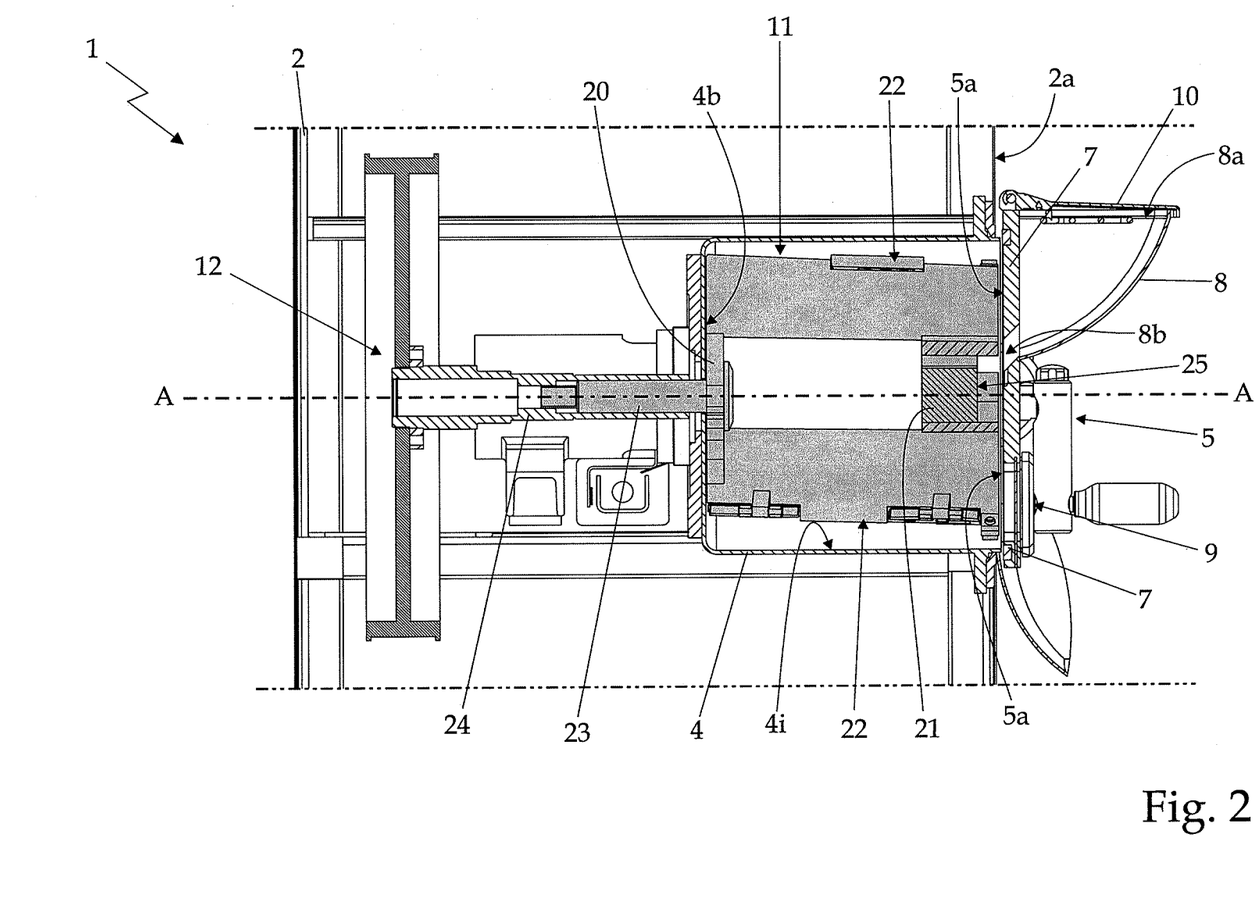
FIG. 2 is a side view of the batch-freezer machine illustrated in FIG. 1 with parts in section and parts removed for clarity.

With reference to FIGS. 1 and 2, with the number is 1 indicated as a whole a horizontal axis batch-freezer machine structured to produce homemade ice-cream, sorbets and similar.

The batch-freezer machine 1 is provided with an external boxlike casing 2 having a substantially parallelepiped shape, and preferably, but not necessarily, provided with wheels resting on the ground 3; and a processing tank 4 of substantially cylindrical shape, extending inside the boxlike casing 2, starting from the front or frontal wall of the casing 2a, while remaining locally coaxial with a reference axis A substantially horizontal and locally substantially perpendicular to the front wall 2a of the boxlike casing 2.

The batch-freezer machine 1 is also provided with a front closing hatch 5 that is structured so as to be able to fluid-tight seal the opening/inlet 4a of the processing tank 4, and is mounted movably on the front wall 2a of the boxlike casing 2 so as to be arranged manually by the user in a closing position wherein the hatch 5 fluid-tight closes the opening 4a of the processing tank 4.

With reference to FIG. 1, the closing hatch 5 is also provided with two-way access to the tank which extend in a pass-through way through the body of the hatch 5 preferably vertically staggered one above the other, and are structured/dimensioned so as to allow the user, respectively, to pour inside the processing tank 4 the ingredients necessary for producing the ice-cream, and to extract the ice-cream from the processing tank 4 at the end of the batch-freezing process.

More in detail, the top tank-access passageway is structured/dimensioned to allow the user to pour inside the processing tank 4 the ingredients necessary for producing the ice-cream at the beginning and/or during the batch-freezing process, while the bottom tank-access passageway is structured/dimensioned to allow the user to extract the ice-cream from the processing tank 4 at the end of the batch-freezing process.

In the example illustrated, in particular, the closing hatch 5 is preferably hinged on the front wall 2a of the boxlike casing 2, at the side of the opening 4a of the processing tank 4, so as to rotate freely around a reference axis B preferably, but not necessarily, vertical, and from a closing position wherein it abuts on the front wall 2a of the casing 2 at the opening 4a, so as to completely obstruct the opening 4a of the processing tank 4.

Preferably, the batch-freezer machine 1 is further provided also with a mechanical locking device 6 manually operated, which is arranged on the front wall 2a of the casing 2 beside the opening 4a of the processing tank 4, and is structured so as to be able to engage and stably lock the closing hatch 5 in abutment on the front wall 2a, for closing the opening 4a of the processing tank 4.

With reference to FIGS. 1 and 2, in the illustrated example, in particular, the closing hatch 5 preferably comprises:
- a disc-shaped body 7 of approximately circular shape, that is laterally hinged on the front wall 2a of the boxlike casing 2, beside the opening 4a of the processing tank 4, and is structured/dimensioned so as to be able to close in a fluid-tight manner the opening/inlet 4a of the processing tank 4;
- a vertical hopper 8 which projects cantilevered from the outer face of the disc-shaped body 7 (i.e. from the face of the disk-like body 7 which remains directed outwardly when the hatch 5 hermetically closes the opening 4a of the processing tank 4), and extends in a pass-through way through the upper part of the disc-shaped body 7 so that the inlet opening 8a and outlet opening 8b of the hopper are arranged on opposite sides of the disc-shaped body 7; and finally
- a discharge outlet 9 with manual opening and closing, that crosses in a pass-through way the bottom of the disc-shaped body 7, preferably immediately behind the lower edge of the same disk-shaped body 7.

The vertical hopper 8 forms the upper access way to the processing tank 4, while the discharge outlet 9 forms the lower access way to the processing tank 4.

The hopper 8, in particular, is preferably structured so that the inlet opening 8a of the hopper is facing upwards, close to the upper edge of the disk-like body 7, and the closing hatch 5 is preferably provided also with a cover 10 structured so as to close the inlet opening 8a of the hopper 8.

The outlet opening 8b of the hopper 8 is instead preferably arranged roughly at the center of the inner face of the disc-shaped body 7, namely at the center of the inner face 5a of the closing hatch 5, so as to be substantially aligned with the center of the opening 4a of the processing tank 4 when the hatch 5 closes the opening 4a of the processing tank 4.

In other words, the tank-access passageway 8 allows pouring the ingredients inside the processing tank 4, namely the top access passageway of the closing hatch 5, overlooks/ends inside the processing tank 4 substantially at the center of the opening 4a of the processing tank 4.

The discharge outlet 9, in turn, is preferably, but not necessarily, provided with a manually operated guillotine closing member, and will not be further described being a component that is already widely known and used in horizontal axis batch-freezer machines.

With reference to FIGS. 1, 2, 3 and 4, the batch-freezer machine 1 is also provided with an internal refrigerating system (not shown) capable of carrying and maintaining the processing tank 4 and its contents at a batch temperature below 0° C. and preferably between −10° C. and −35° C.; and with a mixing member 11 extending into the processing tank 4 for substantially the entire length of the tank, and adapted to rotate about the longitudinal axis A of the tank, and is finally structured/shaped so as to blend/mix the semi-solid mixture which is formed inside the processing tank 4 when rotating inside the processing tank 4.

More in detail, the mixing member 11 is provided with a series of peripheral blades that are structured so as to skim over the internal cylindrical surface of the processing tank 4 for substantially the entire length of the processing tank 4, so that the mixing member 11, when rotating about the longitudinal axis A of the tank, can blend/mix the semi-solid mixture which is formed inside the processing tank 4, and possibly also scrape the internal cylindrical lateral surface 4i of the processing tank 4 so as to detach the semi-solid mixture that sticks on the internal cylindrical lateral surface of the processing tank 4.

With particular reference to FIG. 2, the batch-freezer machine 1 is finally also provided with a motorized drive assembly 12 preferably electrically operated, which is placed outside the processing tank 4, and is mechanically connected to the mixing member 11 at the bottom 4b of the processing tank 4, so as to be able to drive the mixing member 11 in rotation around the longitudinal axis A of the tank.

The internal refrigerating system (not shown) and the motorized drive assembly 12 are devices already widely known in the field of batch-freezer machines and will therefore not be further described.

Figure 3:
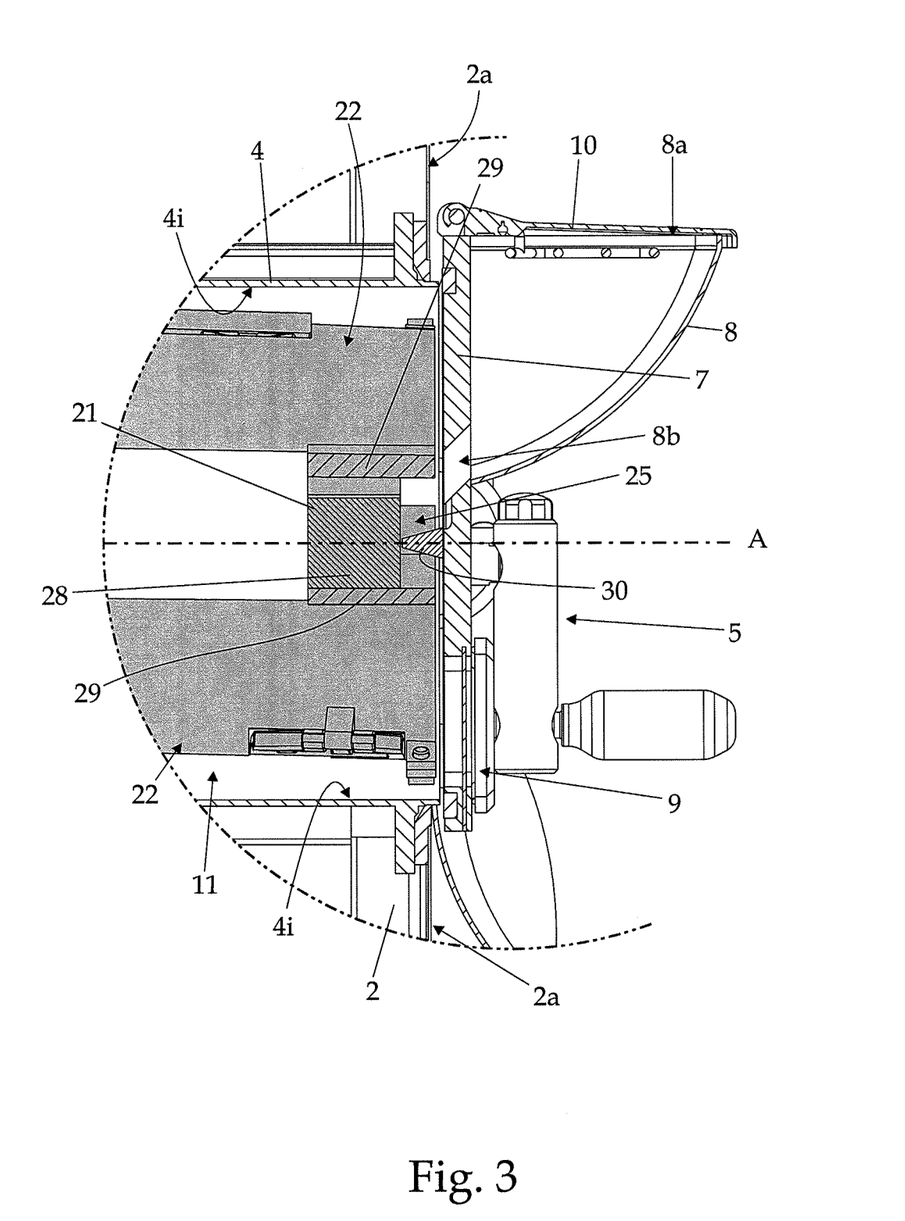
Figure 4:
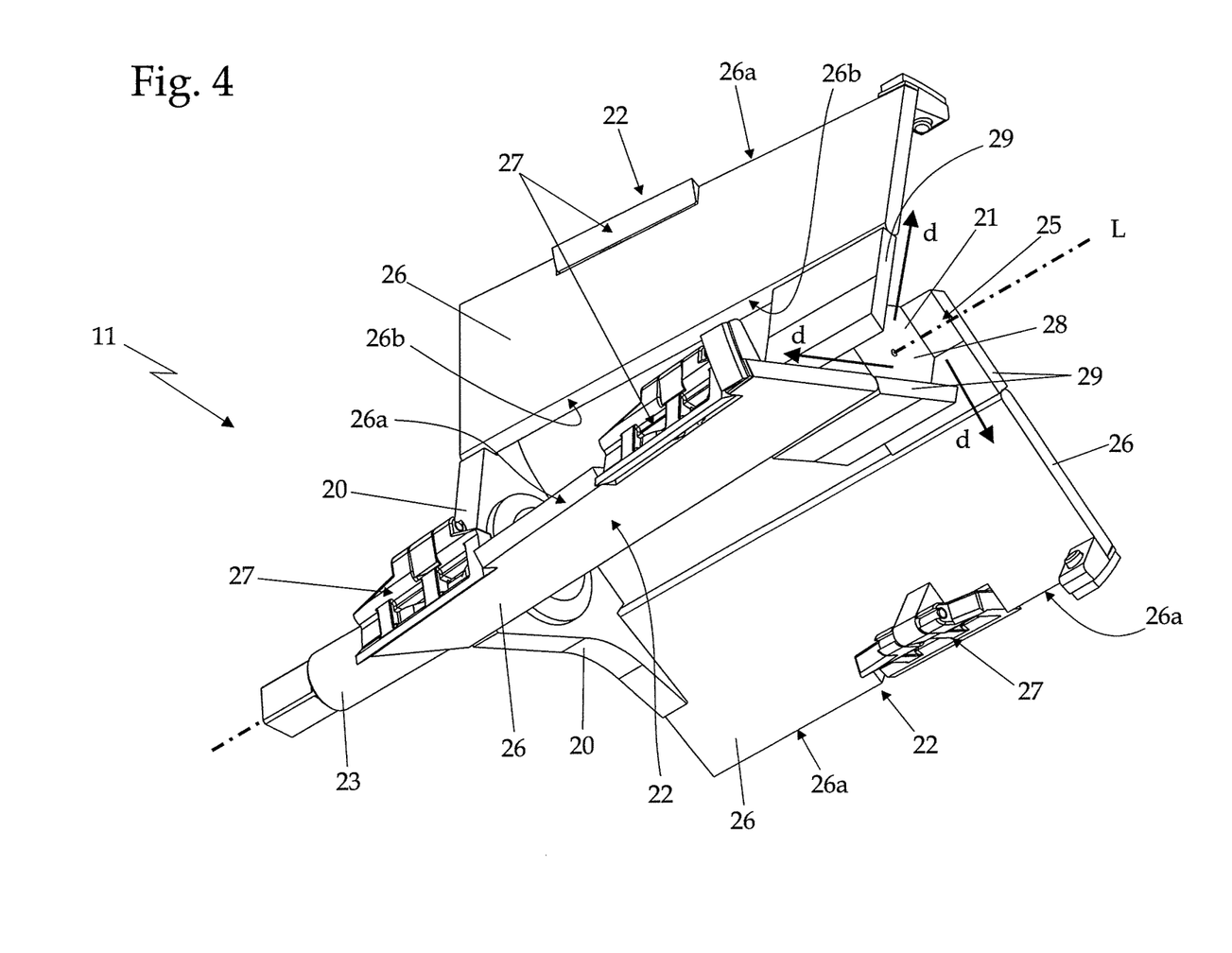
FIG. 4 is a perspective view of the mixing member of the batch-freezer machine illustrated in FIGS. 1, 2 and 3.

With reference to FIGS. 2, 3 and 4, the mixing member 11 is instead preferably structured so as to be coupled to the motorized drive assembly 12 in a rigid and stable, but easily removable way, and extends coaxial to a longitudinal reference axis L that is coincident with the longitudinal axis A of the processing tank 4, when the mixing member 11 is inserted into the processing tank 4.

Preferably the mixing member 11 is also shaped/structured so as to push, when rotating inside the processing tank 4, the semi-solid mixture or ice-cream towards the closing hatch 5.

In addition, the mixing member 11 is also provided of a centrifugal impeller that is arranged coaxial with the longitudinal axis L of the mixing member 11, directly facing the inside face 5a of the closing hatch 5, and is structured so as to be able to push/eject, when the mixing member 11 rotates inside the processing tank 4, the semi-solid mixture situated at the center of the opening 4a of the processing tank 4 towards the internal cylindrical lateral surface 4i of the processing tank 4.

More in detail, in the illustrated example the rotating mixing member 11 preferably comprises: an inner hub 20 and an outer hub 21 that are arranged coaxial to the longitudinal axis L of the mixing member 11, and are spaced one from the other so as to be arranged, when the mixing member 11 is located inside the processing tank 4, immediately near, respectively, the bottom 4b and to the opening 4a of the processing tank 4; and a series of peripheral blades 22 which are angularly spaced about the longitudinal axis L of the mixing member 11, and extend from the inner hub 20 to the outer hub 21 roughly parallel to the longitudinal axis L of the mixing member 11, so as to form a rigid structure substantially in the shape of a cylindrical cage, which is dimensioned so as to be completely inserted inside the processing tank 4.

With reference to FIGS. 2, 3 and 4, the peripheral blades 22 are preferably structured so as to be arranged, when the mixing member 11 is located inside the processing tank 4, locally substantially tangent to the internal cylindrical lateral surface 4i of the processing tank 4, so as to be able to scrape the internal cylindrical lateral surface 4i of the tank when the mixing member 11 rotates about the longitudinal axis A of the tank, inside the processing tank 4.

Preferably, in addition, the peripheral blades 22 are wound around the longitudinal axis L of the mixing member 11 following a trajectory substantially helical, so as to form a kind of screw that, by rotating inside the processing tank 4, is able to push the semi-solid mixture or ice-cream towards the front closing hatch 5. The pitch of the screw is preferably greater than the overall length of the processing tank 4, i.e. of the overall length of the mixing member 11.

Regarding however the two hubs 20 and 21, the inner hub 20 is structured so as to be coupled when it is near the bottom 4b of the processing tank 4, in a rigid and stable, though easily removable manner, with the motorized drive assembly 12, so as to allow the motorized drive assembly 12 to drive in rotation the entire mixing member 11 within the processing tank 4.

More in detail, in the example illustrated the inner hub 20 is preferably provided with a central projecting pin 23 extending coaxially to the longitudinal axis L of the mixing member 11, on the opposite side with respect to the outer hub 21, and is structured/dimensioned so as to engage in an angularly rigid and preferably removable way within a rotating bushing 24 which, in turn, extends coaxial to the longitudinal axis A of the tank through the bottom 4b of the processing tank 4 with the possibility of freely rotate about the longitudinal axis A of the tank, and is mechanically connected to the motorized drive assembly 12 so as to be driven in rotation by the motorized drive assembly 12 about the longitudinal axis A of the tank.

With reference to FIGS. 1, 2, 3 and 4, the outer hub 21 of the mixing member 11 is instead provided with a centrifugal impeller 25 which is arranged coaxial to the longitudinal axis L of the mixing member 11, on the opposite side with respect to the inner hub 20, so as to directly face the inner face 5a of the hatch 5, when the mixing member 11 is inserted inside the processing tank 4 and the hatch 5 fluid-tight closes the opening of the processing tank 4.

The centrifugal impeller 25 is also structured so as to push/eject towards the internal cylindrical lateral surface 4i of the processing tank 4, the semi-solid mixture situated at the center of the opening 4a of the processing tank 4, when the mixing member 11 rotates about the longitudinal axis A of the processing tank 4.

More in detail, the centrifugal impeller 25 is preferably structured so as to skim over the inner face 5a of the hatch 5, and so as to push the semi-solid mixture situated at the center of the opening 4a of the processing tank 4, towards the internal cylindrical lateral surface 4i of the processing tank 4 in a substantially radial direction d.

In the example illustrated, in particular, the centrifugal impeller 25 is preferably made in one piece with the outer hub 21.

Preferably, but not necessarily, the centrifugal impeller 25 is further provided with a number of blades equal to the number of the peripheral blades 22 of the mixing member 11, and each blade of the impeller is shaped so as to be joined with a respective longitudinal peripheral blade 22

With reference to FIGS. 2 and 3, since the outlet opening 8b of the hopper 8 is preferably arranged substantially at the center of the inner face 5a of the hatch 5, the centrifugal impeller 25 of the mixing member 11 is also preferably arranged locally substantially facing the outlet opening 8b of the hopper 8.

The hatch 5 is therefore preferably structured so that the top tank-access passageway 8 ends inside the processing tank 4 substantially in front of the centrifugal impeller 25 of the mixing member 11.

With reference to FIGS. 1, 2, 3 and 4, in the example illustrated, in particular, the mixing member 11 is preferably provided with three longitudinal peripheral blades 22 which are angularly equally spaced around the longitudinal axis L of the mixing member 11.

Furthermore, each longitudinal peripheral blade 22 preferably comprises: a long rectangular plate 26 extending from the inner hub 20 to the outer hub 21 remaining locally substantially parallel to the longitudinal axis L of the mixing member 11 and with the outer side edge 26a locally substantially tangent to the internal cylindrical lateral surface 4i of the processing tank 4; and one or more scraping spatulas 27 arranged on the outer side edge 26a of the rectangular plate 26 so as to rest directly on the internal cylindrical surface 4i of the processing tank 4.

Preferably, moreover, the rectangular plate 26 is warped in parallel to the longitudinal axis L of the mixing member 11 so that the outer side edge 26a of the plate winds around the longitudinal axis L of the mixing member 11 following a trajectory approximately helical whose pitch is preferably greater than the overall length of the processing tank 4, i.e. to the overall length of the mixing member 11.

With reference to FIGS. 2, 3 and 4, preferably the centrifugal impeller 25 is instead composed of a central core 28 which is arranged coaxial to the longitudinal axis L of the mixing member 11, at a predetermined distance from the inner face 5a of the closing hatch 5, and of three blades 29 which are angularly equally spaced around the longitudinal axis L of the mixing member 11 and branch out projecting from the central core 28 in the axial direction until skimming over the inner face 5a of the closing hatch 5, and in a direction substantially radial until reaching and rigidly joining each respective peripheral blade 22 of the mixing member 11.

More in detail, each blade 29 branches out from the central core following a trajectory substantially curved and locally substantially tangent to the periphery of the central core 28, and is shaped so as to reach and directly join with the inner lateral edge 26b of the rectangular plate 26 of the longitudinal peripheral blade 22.

Preferably, each radial blade 29 is finally shaped so as to push the semi-solid mixture situated at the center of the opening 4a of the processing tank 4, towards the internal cylindrical lateral surface 4i of the processing tank 4 in a substantially radial direction d.

With reference to FIG. 3, preferably the closing hatch 5 is also provided with a spacer pin 30 which projects cantilevered from the center of the inner face 5a of the hatch, and is dimensioned so as to reach and rest, when the hatch 5 is in closing position, on the centrifugal impeller 25 of the outer hub 21, or better on the central core 28 of the impeller, so as to keep the centrifugal impeller 25 at a predetermined distance from the inner face 5a of the hatch.

More in detail, the spacer pin 30 extends cantilevered from the center of the inner face 5a of the closing hatch 5 preferably so as to be locally substantially coaxial to the longitudinal axis A of the tank when the hatch 5 is in the closing position, and is dimensioned so as to reach and abut with the distal end on the centrifugal impeller 25 of the outer hub 21, or better on the central core 28 of the centrifugal impeller 25.

The operation of the batch-freezer machine 1 is easily deduced from what described and illustrated above, and requires no further explanation.

Regarding instead the mixing member 11, the centrifugal impeller 25 of the mixing member 11 is able to continuously push towards the cylindrical side wall of the processing tank 4, the semi-solid mixture which tends to accumulate at the center of the opening 4a of the processing tank 4, significantly increasing the amount of air that is incorporated within the semi-solid mixture during the batch-freezing process.

Moreover, as the outlet opening 8b of the hopper 8 directly faces and is aligned to the centrifugal impeller 25 of the mixing member 11, the centrifugal impeller 25 is able to quickly suck inside the processing tank 4 all the ingredients necessary to produce the ice-cream.

The advantages brought by the batch-freezer machine 1 are numerous. Experimental tests have shown that the presence of the centrifugal impeller 25 near the center of the closing hatch 5, where the ice-cream tends to accumulate during the batch-freezing process, allows to obtain a semi-solid mixture much richer in air. Thanks to the greater amount of air incorporated into the semi-solid mixture during the batch-freezing process, the ice-cream that is obtained in output from the machine is much softer and creamier than that obtained with the batch-freezer machines currently on the market.

In other words, thanks to the particular structure of the mixing member 11, the batch-freezer machine 1 is capable of producing a softer and creamier ice-cream than that of the batch-freezer machines currently on the market.

Furthermore, the mixing member 11, or better, the centrifugal impeller 25 of the mixing member 11, is able to maintain the outlet opening 8b of the hopper 8 always clear and clean, so as to facilitate and speed up the feeding of the ingredients towards the inside of the processing tank 4.

Finally, the mixing member 11 can be easily installed even in batch-freezer machines currently on the market, with all the advantages that this entails.

Finally it is clear that to the batch-freezer machine 1 herein described and illustrated modifications and variations can be made without departing from the scope of the present invention.

For example, in a second embodiment, the spacer pin 30 is an integral part of the mixing member 11. More in detail, the spacer pin 30 extends cantilevered from the centrifugal impeller 25, or rather from the central core 28 of the impeller, preferably remaining substantially coaxial to the longitudinal axis L of the mixing member 11, and is dimensioned so as to arrange the distal end thereof in abutment against the inner face 5a of the hatch 5 in the closing position, so as to maintain the centrifugal impeller 25 always at a predetermined distance from the inner face 5a of the hatch.

Finally, in a simplified embodiment the longitudinal peripheral blade 22 may be devoid of the scraping spatulas 27.

The invention claimed is:

1. Batch-freezer machine for producing ice-cream and similar of the type comprising:
   an external casing;
   a substantially cylindrical-shaped processing tank extending inside the casing from a front wall of said casing while remaining coaxial to a substantially horizontal reference axis;
   a front closing hatch structured so as to be able to close an opening of the processing tank in a fluid tight manner; and
   a rotating mixing member housed in an axially rotatable manner inside the processing tank and structured so as to be able to blend/mix the semi-solid mixture that forms inside the processing tank;
   wherein the mixing member extends coaxial to a second reference axis locally substantially coincident with the reference axis of the processing tank and is provided with a centrifugal impeller which is arranged coaxial to said second reference axis so as to be directly faced to an inner face of the hatch, said centrifugal impeller comprising: (i) a central core and (ii) a plurality of blades which are angularly equally spaced around said second reference axis and branch out projecting from the central core in an axial direction such that the blades skim over an inner face of the front closing hatch so as to be able to push/eject the semi-solid mixture located at the center of the opening of the processing tank towards an internal cylindrical lateral surface of the processing tank when the mixing member rotates inside the processing tank.

2. Batch-freezer machine according to claim 1, wherein the centrifugal impeller is structured so as to push the semi-solid mixture located at the center of the opening of the processing tank, towards the internal cylindrical lateral surface of the processing tank in a substantially radial direction.

3. Batch-freezer machine according to claim 1, wherein the mixing member is shaped/structured so as to be able to push the semi-solid mixture or the ice cream towards the hatch when it rotates inside the processing tank.

4. Batch-freezer machine according to claim 1, wherein the hatch is provided with a first pass-through tank-access passageway through which it is possible to pour the ingredients necessary to produce the ice cream inside the processing tank, and in that said first pass-through tank-access passageway ends inside the processing tank substantially in front of said centrifugal impeller.

5. Batch-freezer machine according to claim 1, wherein the mixing member comprises an inner hub and an outer hub which are arranged coaxial to said second reference axis, and are mutually spaced so as to be arranged adjacent, respectively, to the bottom and to the opening of the processing tank, and a series of peripheral blades angularly spaced around said second reference axis, and extending from the inner hub to the outer hub so as to form a rigid structure substantially in the shape of a cylindrical cage; the centrifugal impeller being arranged on the outer hub, on the opposite side with respect to the inner hub.

6. Batch-freezer machine according to claim 5, wherein the peripheral blades are structured so as to be locally substantially tangent to the internal cylindrical lateral surface of the processing tank.

7. Batch-freezer machine according to claim 5, wherein the centrifugal impeller is made in one piece with the outer hub of the mixing member.

8. Batch-freezer machine according to claim 1, further comprising a motorized drive assembly which is arranged outside the processing tank and is connected to the mixing member at the bottom of the processing tank, so as to be able to drive into rotation the mixing member.

9. Batch-freezer machine according to claim 8, wherein the inner hub of the mixing member is structured so as to be able to couple, when positioned adjacent to the bottom of the processing tank, in a rigid and stable, though easily removable manner, with the motorized drive assembly.

10. Batch-freezer machine according to claim 1, wherein the centrifugal impeller is provided with a number of blades equal to the number of peripheral blades of the mixing member, and each blade of the centrifugal impeller is shaped so as to joint with a respective peripheral blade of the mixing member.

11. Batch-freezer machine according to claim 1, wherein the hatch also comprises a spacer pin which projects cantilevered from the inner face of the hatch, and is dimensioned so as to reach and abut against the centrifugal impeller of the mixing member when the hatch closes the opening of the processing tank, so as to maintain the centrifugal impeller at a predetermined distance from the inner face of the hatch.

12. Batch-freezer machine according to claim 1, further comprising an internal refrigerating system capable of taking and maintaining the processing tank and contents of the processing tank to a batch temperature below 0° C.

13. Mixing member for batch-freezer machines for the production of ice cream and similar structured so as to be inserted in an axially rotatable manner inside a substantially cylindrical-shaped processing tank which extends inside the batch-freezer machine while remaining coaxial to a substantially horizontal reference axis, and has an opening closed in a fluid-tight manner by a closing hatch; wherein said mixing member extends coaxial to a second reference axis locally substantially coincident with the reference axis of the processing tank, and is provided with a centrifugal impeller arranged coaxial to said second reference axis so as to be directly faced to an inner face of the hatch, said centrifugal impeller comprising: (i) a central core and (ii) a plurality of blades which are angularly equally spaced around said second reference axis and branch out projecting from the central core in an axial direction such that the blades skim over the inner face of the hatch and structured so as to be able to push/eject the semi-solid mixture situated at the center of the opening of the processing tank towards an internal cylindrical lateral surface of the processing tank when the mixing member rotates inside the processing tank.

14. Mixing member for batch-freezer machines according to claim 13, wherein the centrifugal impeller is structured so as to push the semisolid mixture located at the center of the opening of the processing tank, towards the internal cylindrical lateral surface of the processing tank in a substantially radial direction.

15. Mixing member for batch-freezer machines according to claim 13, wherein the mixing member is shaped/structured so as to be able to push the semi-solid mixture or the ice cream towards the hatch when it rotates inside the processing tank.

16. Mixing member for batch-freezer machines according to claim 13, wherein the mixing member comprises an inner hub and an outer hub which are arranged coaxial to said second reference axis, and are mutually spaced apart so as to be arranged adjacent respectively, to the bottom and to the opening of the processing tank, and a series of peripheral blades which are angularly spaced around said second reference axis, and extend from the inner hub to the outer hub so as to form a rigid structure substantially in the shape of a cylindrical cage; the centrifugal impeller being located on the outer hub, on the opposite side with respect to the inner hub.

17. Mixing member for batch-freezer machines according to claim 13, wherein the centrifugal impeller is made in one piece with the outer hub of the mixing member.

18. Mixing member for batch-freezer machines according to claim 13, further comprising a spacer pin which projects cantilevered from the centrifugal impeller, and is dimensioned so as to arrange the distal end thereof in abutment against the inner face of the hatch in closing position, so to maintain the centrifugal impeller at a predetermined distance from the inner face of the hatch.

* * * * *